US011193542B2

(12) United States Patent
Hauck et al.

(10) Patent No.: US 11,193,542 B2
(45) Date of Patent: Dec. 7, 2021

(54) SEALED UNIVERSAL JOINT BEARING AND UNIVERSAL JOINT BEARING ASSEMBLY

(71) Applicant: AKTIEBOLAGET SKF, Gothenburg (SE)

(72) Inventors: Helmut Hauck, Euerbach (DE); Hubert Herbst, Gädheim (DE); Daniel Jansen, Schwebheim (DE); Christian Knoche, Schweinfurt (DE); Manfred Mattes, Kolbingen (DE); Thomas Niestroj, Würzburg (DE); Stefanie Seufert, Rothhausen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/890,079

(22) Filed: Jun. 2, 2020

(65) Prior Publication Data

US 2020/0392996 A1   Dec. 17, 2020

(30) Foreign Application Priority Data

Jun. 17, 2019  (DE) .......................... 102019208775.2

(51) Int. Cl.
*F16C 33/66* (2006.01)
*F16D 3/41* (2006.01)
*F16D 3/38* (2006.01)

(52) U.S. Cl.
CPC .......... *F16C 33/6651* (2013.01); *F16D 3/385* (2013.01); *F16D 3/41* (2013.01); *F16D 2200/0021* (2013.01); *F16D 2300/06* (2013.01)

(58) Field of Classification Search
CPC .......... F16C 19/26; F16C 19/28; F16C 19/46; F16C 19/463; F16C 19/466; F16C 19/48; F16C 21/005; F16C 33/585; F16C 33/6614; F16C 33/6651; F16C 33/7823; F16C 33/7826; F16C 33/7853; F16C 33/7856; F16C 2361/41; F16D 3/385; F16D 3/41; F16D 3/43; F16D 2200/021; F16D 2300/06

See application file for complete search history.

(56) References Cited

U.S. PATENT DOCUMENTS

| | | | |
|---|---|---|---|
| 4,903,971 A * | 2/1990 | Bauer | ...................... F16C 33/76 |
| | | | 277/351 |
| 5,725,431 A * | 3/1998 | Reynolds | .............. F16C 17/047 |
| | | | 464/128 |
| 6,264,566 B1 * | 7/2001 | Nieman | ..................... F16D 3/41 |
| | | | 464/132 |

(Continued)

*Primary Examiner* — Phillip A Johnson
(74) *Attorney, Agent, or Firm* — J-Tek Law PLLC; Scott T. Wakeman; Mark A. Ussai (57) ABSTRACT

A sealed universal joint bearing includes a pot-shaped component having a disk-shaped base and a cylindrical wall projecting from a periphery of the base, and an inner surface of the base and an inner surface of the cylindrical wall define an interior of the pot-shaped body. At least one row of rolling elements are configured to roll along the inner surface of the cylindrical wall. A flange in the interior of the pot-shaped component has a flange surface against which end sides of the rolling elements are configured to slip during bearing operation, and the flange surface includes at least one formation configured to reduce a contact area between the flange surface and the end sides of the rolling elements.

17 Claims, 6 Drawing Sheets

(56) References Cited

U.S. PATENT DOCUMENTS

| | | | | |
|---|---|---|---|---|
| 6,336,868 B1* | 1/2002 | Kurecka | ............... | F16C 21/005 464/134 |
| 6,991,545 B2* | 1/2006 | Schultze | ............... | F16C 21/005 464/128 |
| 2009/0207340 A1* | 8/2009 | Jang | ..................... | G02B 6/0053 349/65 |
| 2018/0058508 A1* | 3/2018 | Campbell | ............... | F16C 17/04 |

* cited by examiner

SEALED UNIVERSAL JOINT BEARING AND UNIVERSAL JOINT BEARING ASSEMBLY

CROSS-REFERENCE

This application claims priority to German patent application no. 10 2019 208 775.2 filed on Jun. 17, 2019, the contents of which are fully incorporated herein by reference.

TECHNOLOGICAL FIELD

The disclosure is directed to a sealed universal joint bearing.

BACKGROUND

Figure 1:
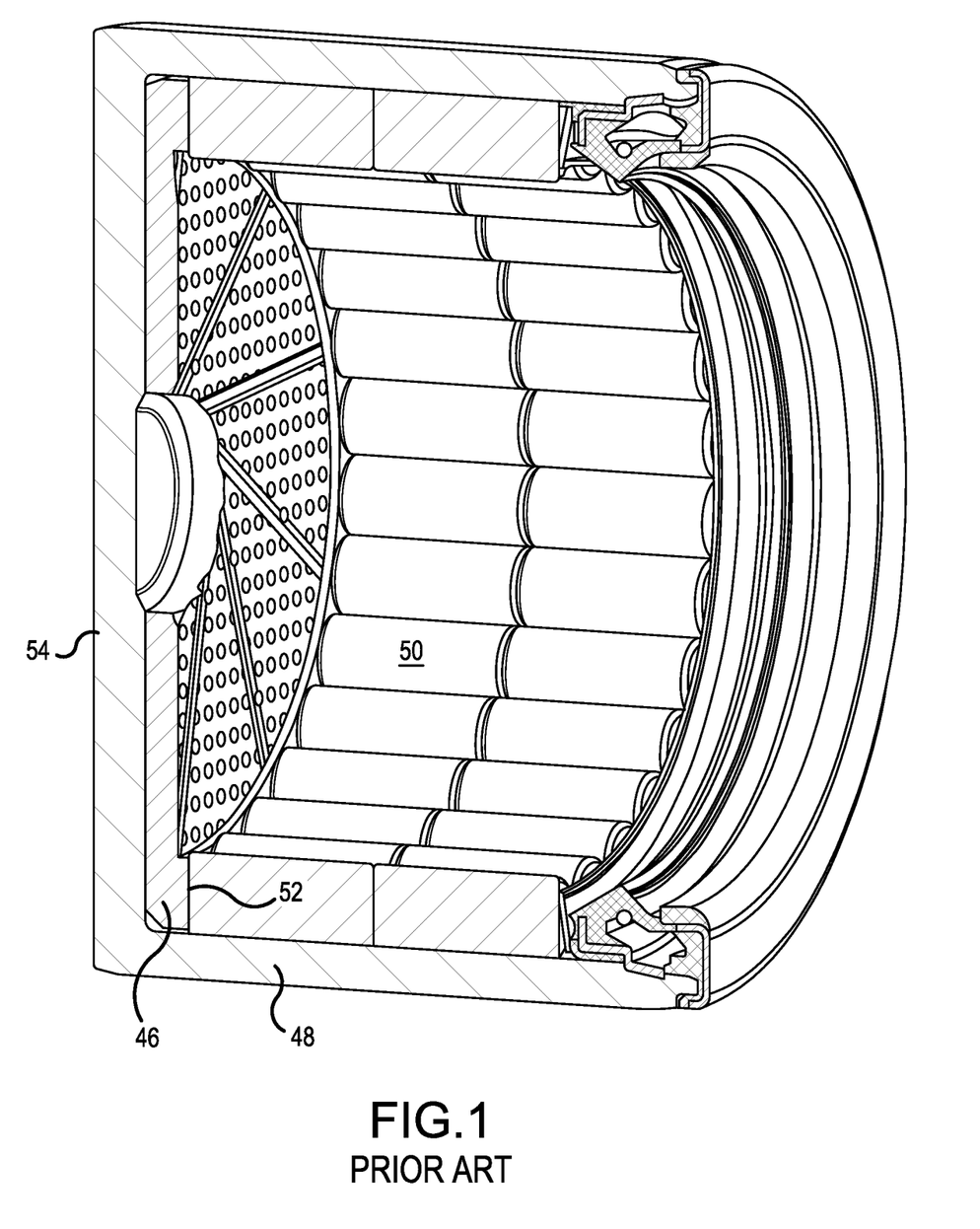
FIG. 1 is an axial section through a conventional sealed universal joint bearing.

A sealed universal joint bearing is known (cf. FIG. 1) that includes a plastic component 46, and a pot-shaped component 48 that forms an outer ring for rolling elements 50 of the sealed universal joint bearing. The plastic component includes a flat flange surface 52 that is provided for the end sides of the rolling elements to slip against during operation of the bearing. Here the end sides face a base 54 of the pot-shaped component. The flange surface is flat.

SUMMARY

An aspect of the disclosure is to provide a sealed universal joint bearing of the above-described type having a long service life.

The disclosure emanates from a sealed universal joint bearing including at least one row of rolling elements and a flange surface for the end sides of the rolling elements to slip against during bearing operation, wherein the end sides face a base of a pot-shaped component of the sealed universal joint bearing.

In the disclosure, the flange surface includes at least one formation. A long service life can thereby be achieved. In particular, lubricant can be provided in the vicinity of the end side.

In particular it can be achieved that end sides of the rolling elements do not slip on the flange surface over their entire surface, but rather regions of the flange surface that would receive relatively high heat during operation due to friction with the end surfaces have no contact with the end surfaces during operation, so that these regions are spared in operation and the flange surface therefore has a longer service life. In particular, such a region is provided by a radially innerlying partial surface of the flange surface.

Preferably a part of the rolling elements or all rolling elements each include a region, on their end sides that are facing the base, that lies radially inward relative to an axis of rotation of the sealed universal joint bearing, about which the centers of gravity of the rolling elements rotate during an operation process, and that is spaced from the flange surface. A long service life can thereby be achieved.

Advantageously the at least one formation is at least partially formed by an at least essentially ring-segment-shaped elevation. In this way a constructively simple design can be achieved.

Furthermore the flange surface may include a plurality of formations, some or all of which are essentially ring-segment-shaped elevations that together form, at least essentially, at least one ring or, at least essentially, at least one ring including interruptions. In this way a cost-effective design can be achieved.

The formations together preferably form at least two structures each of which is either at least essentially a ring, or at least essentially a ring including interruptions. In this manner the rolling elements can be made to slip against the two structures, and a tilting of the rolling elements with respect to an axis that is perpendicular to the axis of rotation of the sealed universal joint bearing can be prevented, wherein simultaneously the partial surfaces of the end sides of the rolling elements that are facing the base slide with minimized sliding-speed differences against the two structures during operation.

The flange surface preferably includes at least one lubricant transport structure that is provided to allow for lubricant movement in the radial direction. "Provided" should be understood in particular to mean specially designed and/or specially equipped. In this context "radial direction" should be understood to mean with respect to the axis of rotation of the sealed universal joint bearing. A good lubricant supply and in particular the possibility of a relubrication can thereby be achieved.

The flange surface is advantageously at least partially or completely made of steel. In this way a long service life can be achieved.

In addition, the flange surface may be formed one-piece with a component that forms an outer ring of the sealed universal joint bearing. "One-piece" should be understood in particular to mean made of a casting and/or only separable by destruction and/or originating from an extrusion, wherein in particular a post-processing can be effected by cutting and/or pressing and/or rotating and/or turning and/or grinding. A cost-effective manufacturability can thereby be achieved, in particular by stamping.

The sealed universal joint bearing preferably includes at least one at least essentially ring-shaped component that forms the flange surface. Various flange sizes can thereby be incorporated in a simple manner for various bearing types by the use of different annular components.

Furthermore the flange surface may be formed by a component of the sealed universal joint bearing, which component is attached in a material-bonded manner to a plastic component of the sealed universal joint bearing, which plastic component is directly disposed on a base of a component of the sealed universal joint bearing, which component forms an outer ring for the rolling elements of the sealed universal joint bearing. A simple assembly can thereby be achieved due to a reduced number of components.

Furthermore, a sealed universal joint bearing, in particular according to one of the above-mentioned designs, may include at least one row of rolling elements and a flange surface for the end sides of the rolling elements to slip against during an operation, wherein the end sides face a base of a pot-shaped component of the sealed universal joint bearing, wherein the flange surface is formed by a component that is formed separately from the pot-shaped component, wherein the flange surface is at least partially, in particular completely, made of at least one metallic material. A long service life can thereby be achieved.

In addition, a universal joint bearing assembly including at least the sealed universal joint bearing is disclosed.

Further advantages arise from the following description of the drawings. Exemplary embodiments of the invention are depicted in the drawings. The drawings, the description, and the claims contain numerous features in combination. The person skilled in the art will also advantageously consider the features individually and combine them into further meaningful combinations.

DETAILED DESCRIPTION

Figure 2:
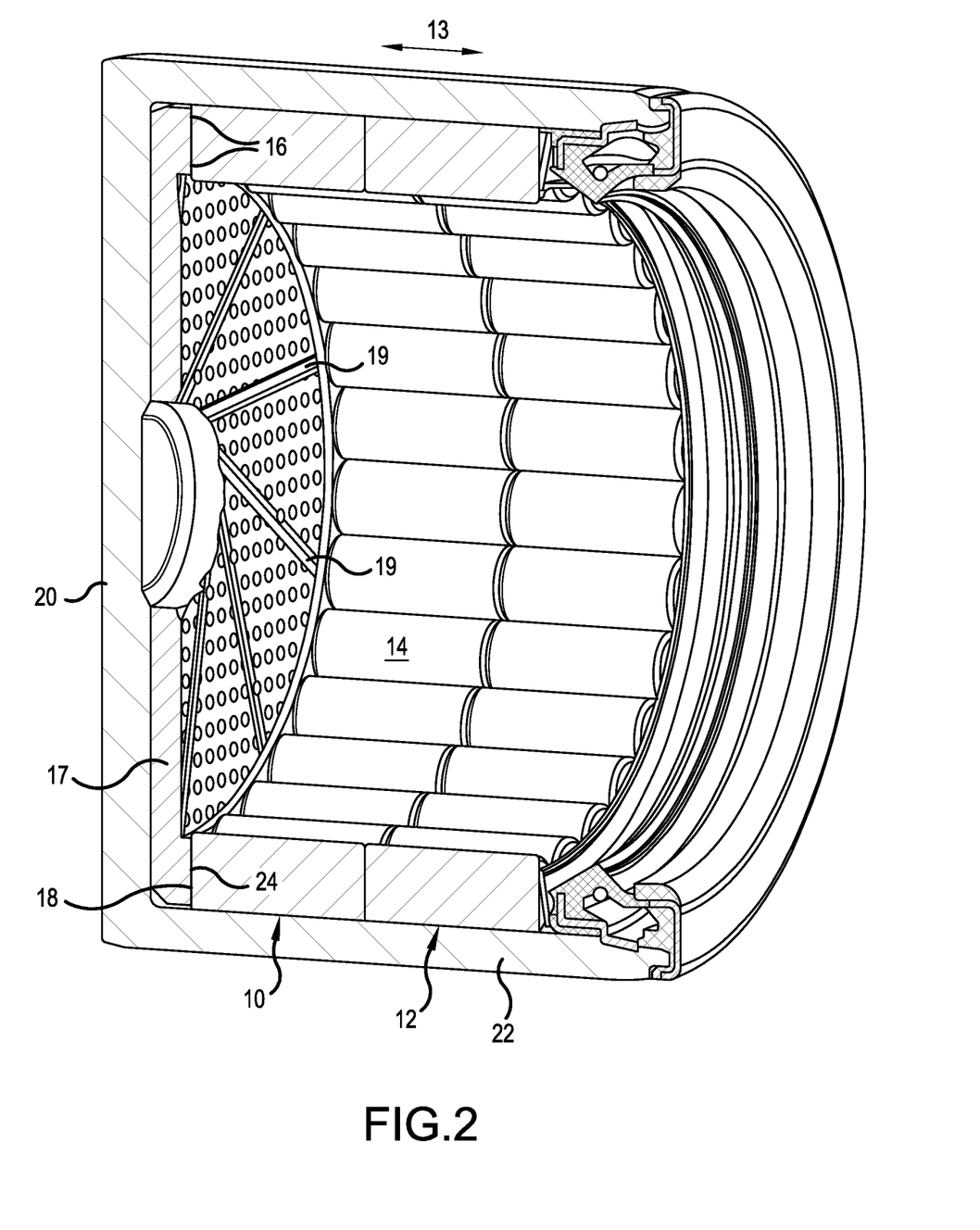
FIG. 2 is an axial section through a sealed universal joint bearing according to an embodiment of the invention, which bearing is not finally mounted on an inner ring.

FIG. 2 is an axial section through a sealed universal joint bearing according to an embodiment of the disclosure that includes a first row 10 of rolling elements 14 and a second row 12 of rolling elements 14. The first and second rows 10, 12 are disposed one-behind-the-other in the axial direction 13 of the sealed universal joint bearing. The sealed universal joint bearing includes a flange surface 16, against which end sides 18 of the rolling elements 14 of the row 10 slip during an operation of the sealed universal joint bearing in an installed, finally mounted state. The respective end sides 18 face a base 20 of a pot-shaped component 22 of the sealed universal joint bearing. The flange surface 16 includes a formation 24 that is configured in the present embodiment as an annular groove (FIGS. 2 to 4), that has approximately a diameter of a pitch circle of the sealed universal joint bearing. The flange surface 16 is part of a disc 17 of the sealed universal joint bearing; the flange surface 16 is completely comprised of steel and is formed one-piece. In the formation 24, lubricant (not shown) is disposed that lubricates the contact between the rolling elements 14 and the flange surface 16. The lubricant is preferably lubricating grease; however oil can also be used.

The disc 17 includes recesses radially inside the flange surface 16, which recesses are configured as through-holes in the present exemplary embodiment. In alternative embodiments, recesses can be provided by depressions and/or stampings and/or blind holes and/or through-holes. The recesses form a regular structure. The disc 17 includes grooves 19 that extend, obliquely to the radial direction, from radially inward to radially outward and serve for lubricant transport. At the axial end of the sealed universal joint bearing opposite the base 20, a seal is disposed that is attached to the pot-shaped component 22. The disc 17 includes a central, circular through-hole, into which, in some exemplary embodiments, in a completely finally mounted state relubrication channels of a journal open, wherein independently of the presence of relubrication channels, lubricant can be disposed in the through-hole.

Figure 3:
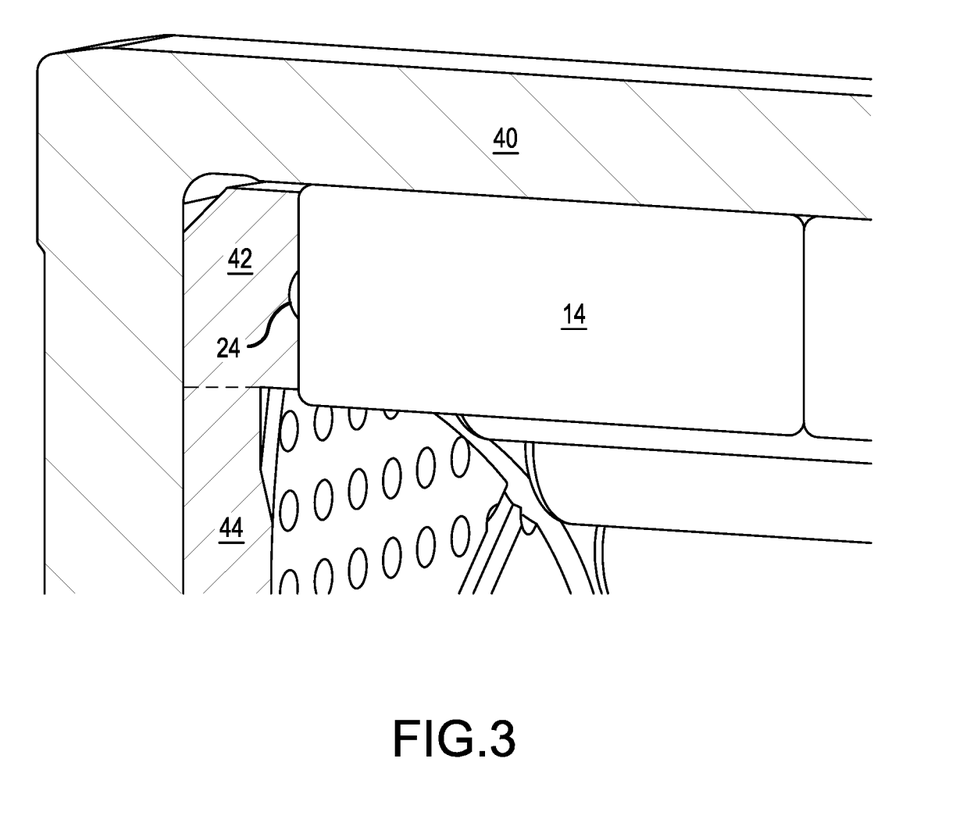
FIG. 3 is an enlarged detail from FIG. 2.
Figure 4:
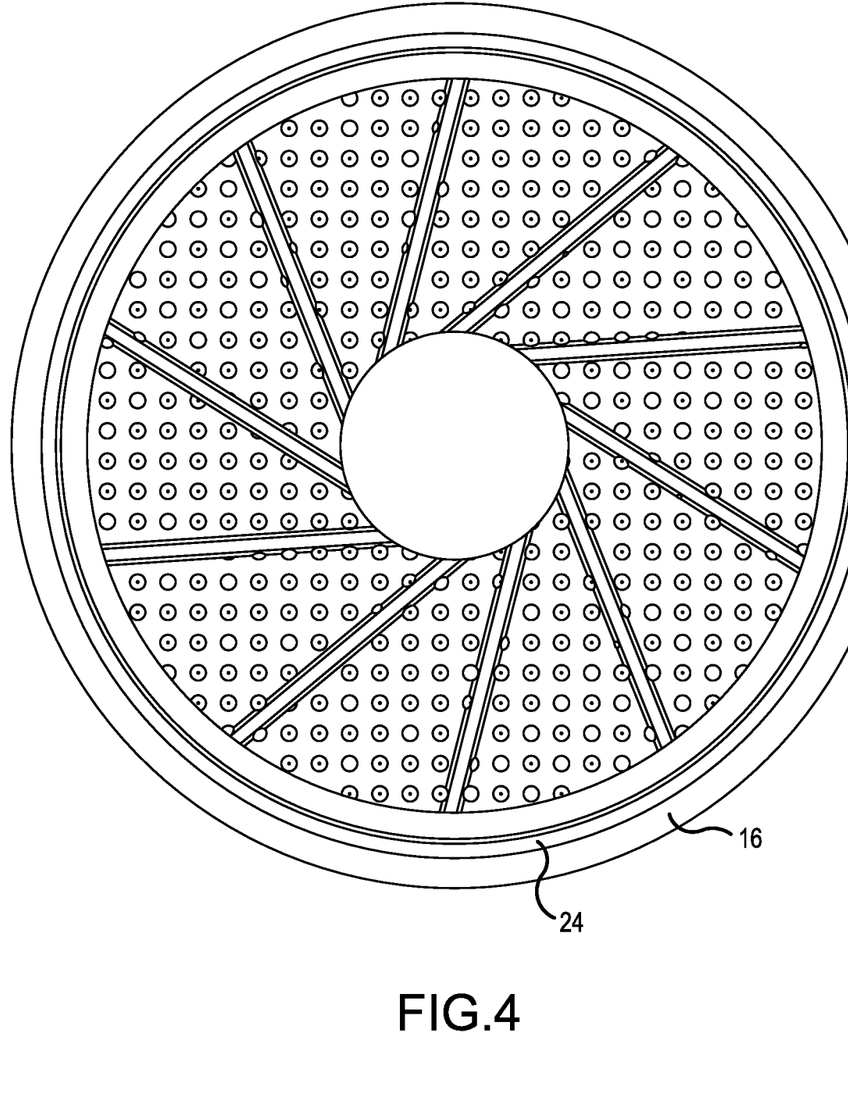
FIG. 4 is an axial view of a component of the sealed universal joint bearing from FIG. 2.

As an alternative to the one-piece design of the disc 17, the disc 17 can also be divided into a plurality of, preferably two, components, and specifically into a component 42 and a plastic component 44, as indicated in FIG. 3 by a dashed line. The essentially annular component 42 is then made of steel and can be attached to the plastic component 44 or merely be inserted. The plastic element is disposed directly against the base and contacts it. Walls of the pot-shaped component 22 form an outer ring including raceways for the rows 10, 12. In a completely finally mounted state the sealed universal joint bearing is part of a universal joint bearing assembly that includes a journal that forms an inner ring for the rows 10, 12.

In one alternative embodiment, the plastic element 44 can be replaced by a geometrically identically configured element that is made of steel.

In a further alternative embodiment, the component 42 can also be provided by a hollow-cylindrical ring that is penetrated in the axial direction along the entire surface by holes, i.e., is perforated.

In a further alternative embodiment, the flange surface can be made of plastic.

Inventive sealed universal joint bearings are usable in automobiles, trucks, and also in industrial applications, such as in particular rolling mills.

Figure 5:
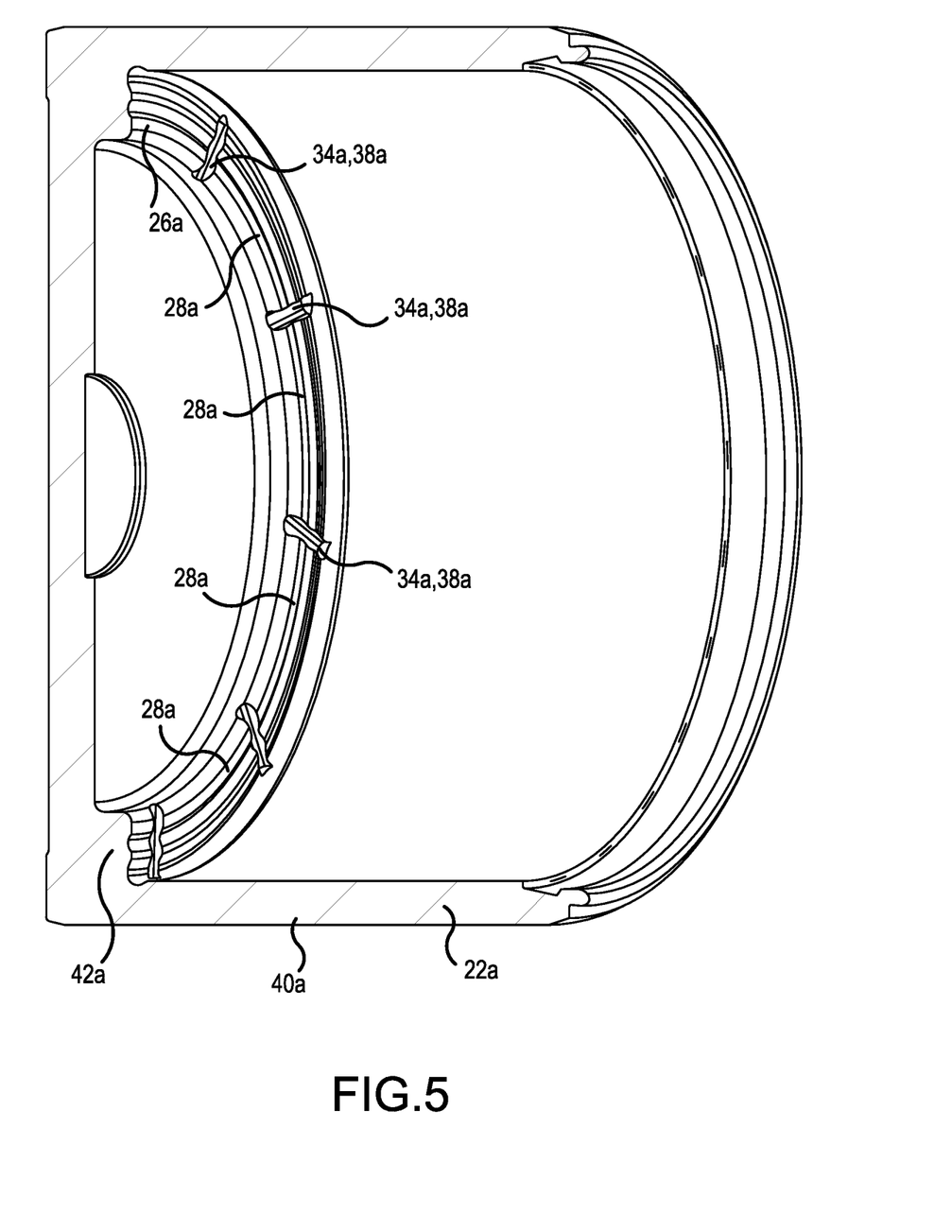
FIG. 5 is an axial section through a part of a further embodiment of a sealed universal joint bearing.
Figure 6:
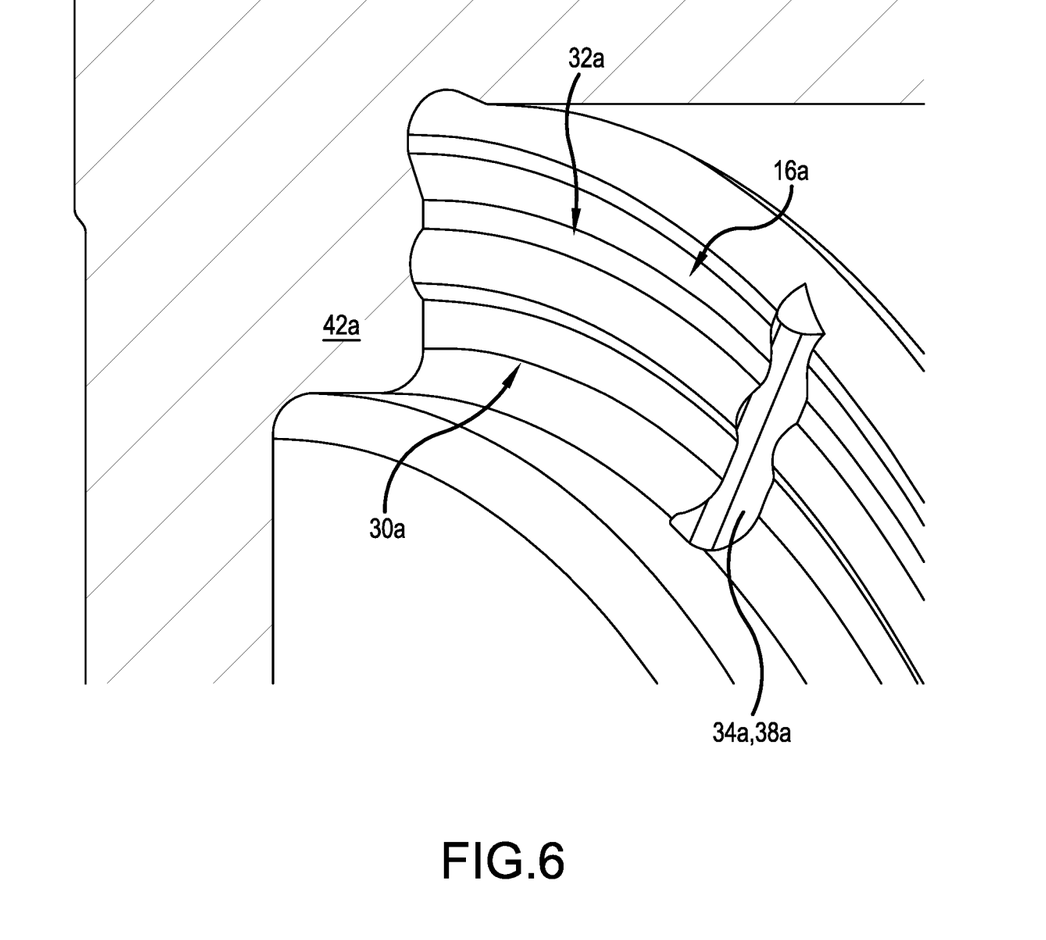
FIG. 6 is an enlarged view from FIG. 5.

In FIGS. 5 and 6 an alternative exemplary embodiment is depicted. Essentially identical components, features, and functions are generally numbered with the same reference numbers. However, to differentiate between the exemplary embodiments, the letter "a" is added to the reference numbers of the exemplary embodiment of FIGS. 5 and 6. The following description is essentially limited to the differences with respect to the exemplary embodiment in FIG. 2 to FIG. 4, wherein with respect to components, features, and functions remaining the same, reference can be made to the description of the exemplary embodiment in FIG. 2 to FIG. 4.

FIG. 5 shows a part of an alternative embodiment of a sealed universal joint bearing according to the present disclosure. An essentially annular component 42a is formed one-piece with a pot-shaped component 22a and includes a flange surface 16a. The flange surface includes an elevation 26a that is ring-segment-shaped. In addition to the elevation 26a, the flange surface includes further formations 28a that are also ring-segment-shaped elevations and are configured geometrically identical to the elevation 26a. Between the elevations, interruptions 34a are disposed that are groove-shaped and extend, obliquely to the radial direction, from radially inward to radially outward, and when the plastic component 44 is inserted into the annular component 22a, act as extensions of the grooves 19 of the plastic component 44. The grooves 19 and the interruptions 34a serve for lubricant transport in particular from radially inward to radially outward, and specifically in particular during a relubrication. The interruptions 34a are thus a lubricant transport structure 38a of the flange surface. In one alternative design, the interruptions 34a are omitted, so that the flange surface includes two annular elevations.

Together the elevation 26a and the formations 28a form a structure 30a that has the shape of a ring that is interrupted by the interruptions 34a. Radially outside the structure 30a, the flange surface includes a second structure 32a that also has the shape of a ring that is interrupted by the interruptions 34a.

Contact surfaces of the flange surface with the rolling elements 14a are only provided by axially innermost-lying surfaces of the structures 30a, 32a. These contact surfaces are smaller than the contact surfaces of the prior art shown in FIG. 1, whereby sliding-speed differences between partial regions of an and surface of the rolling elements that slip against the contact surfaces are minimized.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved sealed universal joint bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Row
12 Row
13 Axial direction
14 Rolling element
16 Flange surface
17 Disc
18 End side
19 Groove
20 Base
22 Component
24 Formation
26 Elevation
28 Formation
30 Structure
32 Structure
34 Interruption
36 Lubricant transport structure
38 Outer ring
42 Component
44 Plastic component
46 Plastic component
48 Component
50 Rolling element
52 Flange surface
54 Base

What is claimed is:

1. A sealed universal joint bearing comprising:
a pot-shaped component having a disk shaped base and a cylindrical wall projecting from a periphery of the base, an inner surface of the base and an inner surface of the cylindrical wall defining an interior of the pot-shaped body,
at least one row of rolling elements configured to roll along the inner surface of the cylindrical wall, and
a flange in the interior of the pot-shaped component having a flange surface against which end sides of the rolling elements are configured to slip during bearing operation, the flange surface including at least one formation,
wherein the at least one formation comprises a first substantially ring-segment-shaped elevation.

2. The sealed universal joint bearing according to claim 1, wherein the at least one formation comprises a plurality of substantially ring-segment-shaped elevations that together form at least one ring or at least one ring including interruptions.

3. The sealed universal joint bearing according to claim 2, wherein the plurality of substantially ring-segment-shaped elevations together form at least two structures, wherein each of the structures is substantially ring shaped or substantially ring shaped with interruptions.

4. The sealed universal joint bearing according to claim 1, wherein the flange surface includes at least one lubricant channel configured to allow movement of a lubricant in a radial direction.

5. The sealed universal joint bearing according to claim 1, wherein the flange is at least partially made of steel.

6. The sealed universal joint bearing according to claim 1, wherein the flange is formed in one-piece with a component that forms an outer ring of the sealed universal joint bearing.

7. The sealed universal joint bearing according to claim 1, wherein the flange surface is substantially annular.

8. The sealed universal joint bearing according to claim 1, wherein the flange is formed in one piece with the pot-shaped component.

9. The sealed universal joint bearing according to claim 1, including a plastic spacer disposed against the base of the pot-shaped component,
wherein the flange is materially bonded to an outer circumference of the plastic spacer.

10. The sealed universal joint bearing according to claim 1, wherein the flange surface includes a second substantially ring-segment-shaped elevation.

11. The sealed universal joint bearing according to claim 1,
wherein the end sides of the rolling elements face the base of the pot-shaped component,
wherein the flange is not a part of the pot-shaped component, and
wherein the flange is at least partially metallic.

12. A sealed universal joint bearing comprising:
a pot-shaped component having a disk shaped base and a cylindrical wall projecting from a periphery of the base, an inner surface of the base and an inner surface of the cylindrical wall defining an interior of the pot-shaped body,
at least one row of rolling elements configured to roll along the inner surface of the cylindrical wall, and
a flange in the interior of the pot-shaped component having a flange surface against which end sides of the rolling elements are configured to slip during bearing operation, the flange surface including at least one formation,
wherein the at least one formation comprises a first annular elevation and a second annular elevation radially spaced from the first annular elevation by a groove, and
wherein the flange includes at least one channel that forms a circumferential interruption in the first annular elevation.

13. A sealed universal joint bearing comprising:
a pot-shaped body having a disk shaped base and a cylindrical wall projecting from a periphery of the base, an inner surface of the base and an inner surface of the cylindrical wall defining an interior of the pot-shaped body, and at least one row of rolling elements configured to roll along the inner surface of the cylindrical wall, a flange at a junction of the inner surface of the base and the inner surface of the cylindrical wall, the flange including at least one radially outer flange surface portion against which end sides of the rolling elements are configured slip during bearing operation and at least one radially inner flange surface portion against which end sides of the rolling elements are configured to slip during bearing operation and an offset surface portion between the radially outer flange surface portion and the radially inner flange surface portion, the offset surface portion being spaced from the end sides of the rolling elements when the at least one radially outer flange surface portion and the at least one radially inner flange surface portion contact the end sides of the rolling elements.

14. The sealed universal joint bearing according to claim 13, including a spacer having a first side in contact with the inner surface of the base, wherein the flange is formed on the spacer.

15. The sealed universal joint bearing according to claim 14, wherein the spacer comprises an inner portion formed of plastic and the flange is metallic.

16. The sealed universal joint bearing according to claim 13, wherein the flange is formed in one piece with the pot-shaped component.

17. The sealed universal joint bearing according to claim 13, wherein the offset surface portion overlies a pitch circle of the at least one row of rolling elements.

\* \* \* \* \*